Feb. 20, 1951   R. C. FERGASON   2,542,646
CORN HARVESTER HAVING AUXILIARY EAR DETACHER
Filed July 9, 1945   4 Sheets-Sheet 1

Inventor
Rector C. Fergason
by K. S. Wyman
Attorney

Feb. 20, 1951 R. C. FERGASON 2,542,646
CORN HARVESTER HAVING AUXILIARY EAR DETACHER
Filed July 9, 1945 4 Sheets-Sheet 2

Inventor
Rector C. Fergason
K. S. Wyman
Attorney

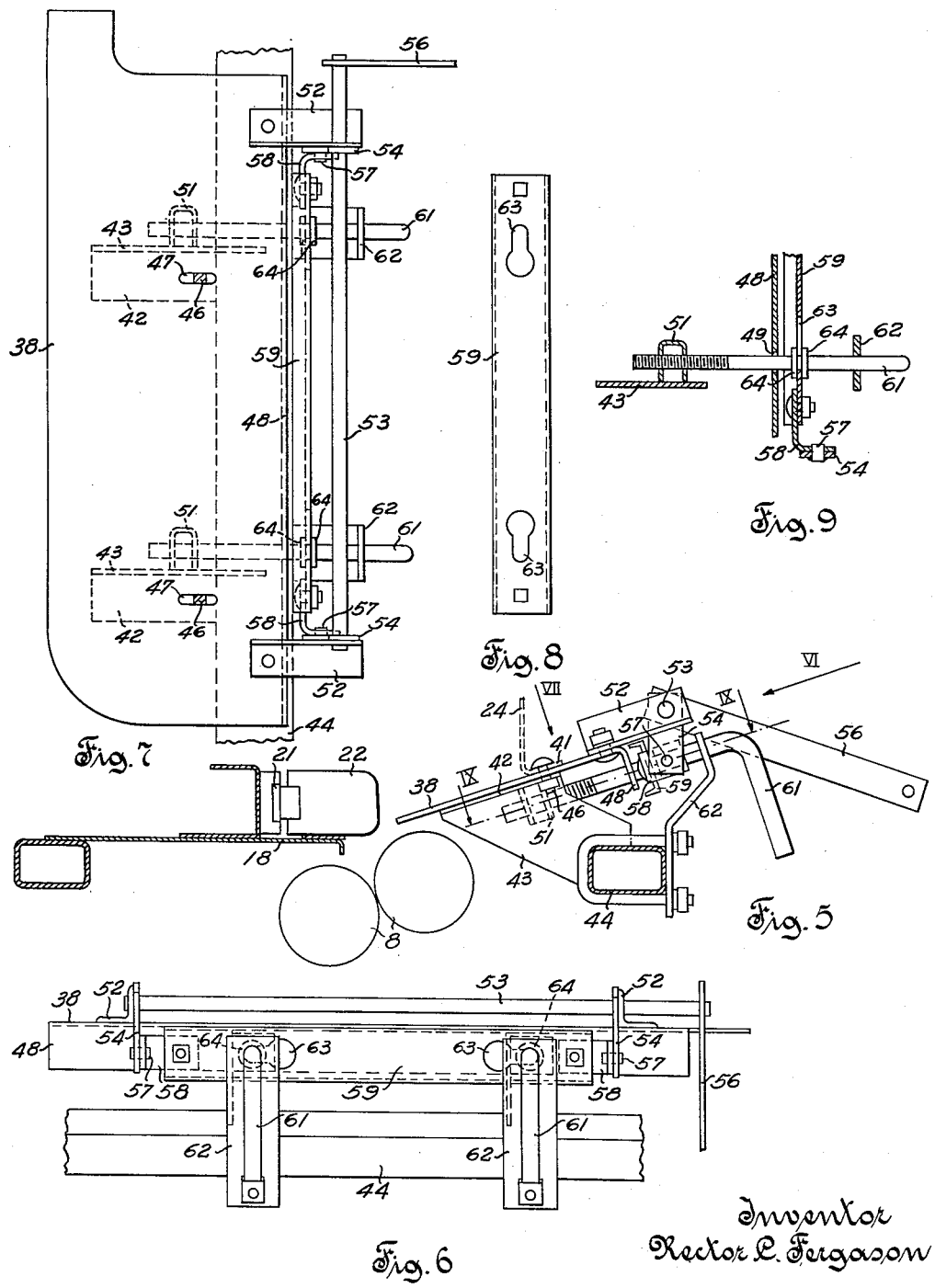

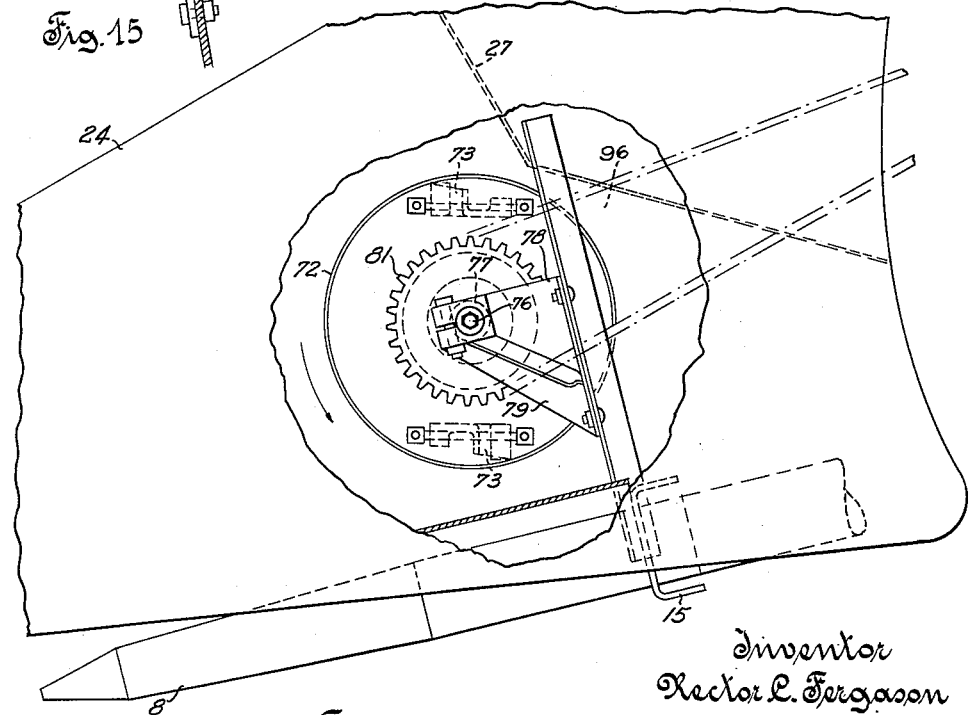

Patented Feb. 20, 1951

2,542,646

UNITED STATES PATENT OFFICE 2,542,646

CORN HARVESTER HAVING AUXILIARY EAR DETACHER

Rector C. Fergason, La Porte, Ind., assignor to Allis-Chalmers Manufacturing Company, Milwaukee, Wis., a corporation of Delaware Application July 9, 1945, Serial No. 603,813

11 Claims. (Cl. 56—108)

1

This invention relates generally to traveling corn harvesters of the type embodying ear picking and/or husk removing rolls or the like, and is more particularly concerned with the provision of means for eliminating or minimizing the necessity of stopping operations in order to permit the operator to remove plugging accumulations of trash and/or appropriately adjust the spacing of a stripper plate or the like in an effort to obtain trouble-free and effective picking operation, for improving husking effectiveness, and/or for controlling the husking action of rolls or the like receiving the picked ears.

In this connection, the crop and weed growth and the moisture content of same often vary considerably throughout a single field and even throughout individual rows in a field due to differences in the nature, fertility and moisture content of the soil. And prior to this invention, there has been lack of suitable all-around facility for satisfactorily mechanically picking corn in such fields, more particularly green corn, without sometimes stopping the harvester to permit the operator to remove accumulations of trash plugging same and/or to adjust the spacing of the stripper plates to conform with the variations in crop and weed growth encountered in different portions of the field. In fact, variations in crop and weed growth sufficient to adversely affect picking operations are at times encountered with a frequency and suddenness rendering it impractical or impossible for the operator to stop forward movement of the harvester and appropriately adjust the spacing of the stripper plates. And as a result, either a large portion of the small ears are not picked due to a wide setting of the stripper plates or the passage between the snapping and husking rolls becomes choked or plugged with an excess of stalks and weeds which are sheared or broken off by a too close setting of such plates. Moreover, unless forward movement of the harvester could be stopped and the stripper plates adjusted before a dense growth of stalks and weeds is engaged by the snapping rolls, continued operation of the snapping rolls and of the rearwardly feeding gathering and conveying chain might result in a plugging of the machine.

In addition to the aforementioned disadvantages, prior art machines embodying longitudinally aligned snapping and husking rolls or roll sections are in general lacking a satisfactory means for positioning picked ears on the husking rolls with their tip or tassel ends pointing in their direction of travel over and along such rolls to

2 thereby facilitate removal of the husks from the ears. Another disadvantage of prior art machines is a lack of suitable facility for feeding trash, tending to accumulate in the passage between the picking and husking rolls or roll sections, forwardly of the snapping rolls and out of said passage to thus minimize the chances of plugging under conditions producing an excess of trash, and for suitably rendering the machine self-operative to remove plugging accumulations of trash simply by stopping its forward travel. Still another disadvantage of prior art machines is that they are lacking an inexpensive, readily adjustable means for selectively rendering the husking rolls either effective to remove the husks from picked ears traveling thereover or effective as a nonhusking, trash removing conveyor part over and along which the picked ears travel in passing from the snapping rolls to a wagon loading conveyor or other means for removing picked ears from the harvester.

Therefore, the primary object of this invention is to provide corn harvesters with ear picking and/or husking appurtenances operative to improve, in general the effectiveness and reliability.

Another object of this invention is to provide corn harvesters embodying a stripper plate or the like with means permitting the operator to suddenly effect desired changes in stripper plate spacing without stopping either forward travel of the harvester or operation of the picking mechanism.

Another object of this invention is to provide corn harvesters embodying series arranged ear snapping and husking rolls or roll sections, with a feeding means operative to position picked ears in longitudinal alignment with respect to the husking rolls with their tasseled ends pointing in their direction of travel whereby the tasseled ends of the ears are first presented to the husking rolls.

Another object of this invention is to provide corn harvesters embodying series arranged ear snapping and husking rolls or roll sections and a conventional conveying means traveling longitudinally of the rolls, with an additional means operative in part to augment the feeding action of the conveying means and in part to position picked ears for movement by the conveying means with their tasseled ends pointing in their direction of travel whereby operation of the conveying means results in the tasseled ends of the ears being first presented to the husking rolls.

Another object of this invention is to provide corn harvesters with an improved, auxiliary feeding means positioned in adjacent overlying relation with respect to the rear ends of the snapping rolls and operative in part to augment the feeding action of the usual conveying means associated with such rolls and in part to feed any trash which may accumulate adjacent the rear ends of the snapping rolls upwardly and forwardly relative to such rolls and out of the throat of the passage formed in part by the rear ends of such rolls.

Still another object of this invention is to provide corn harvesters embodying husking rolls or roll sections interposed between the ear picking mechanism and a wagon loading conveyor or other means removing picked and husked ears from the harvester, with means for selectively rendering the husking rolls either effective as such or effective as a nonhusking trash removing conveyor part over and along which picked ears travel in passing out of the machine.

The construction, application and operation of apparatus for accomplishing one or more of the previously specified objects and advantages will become readily apparent as the disclosure progresses and particularly points out additional objects and advantages of special importance. And accordingly the present invention may be considered as consisting of the various details of construction, combinations of elements, and arrangements of parts as is more fully set forth in the description and claims, reference being had to the accompanying drawings, illustrating an embodiment of the invention and in which:

Fig. 5 is a partial section taken on line V—V of of Fig. 2 omitting the rotary feeder and showing the mounting of the readily adjustable stripper plate and its coaction with the rolls, with the other stripper and with the gathering chain;

Fig. 6 is a side view of the stripper plate structure shown in Fig. 5 looking in the direction as indicated by arrow VI;

Fig. 7 is a plan view of the stripper plate structure shown in Fig. 5 looking in the direction indicated by arrow VII;

Fig. 8 is a side view of the U-shaped channel element embodied in the stripper plate mounting;

Fig. 9 is a section taken on line IX—IX of Fig. 5;

Fig. 10 is a partial side view similar to Fig. 1 with parts enlarged and broken away to better show the mounting means for the rotary feeder;

Fig. 11 is a view similar to Fig. 5 but including the rotary feeder and showing the manner in which the biased fingers thereon coact with the readily adjustable stripper plate and with the ears as they are snapped from stalks passing between the stripper plates and rolls;

Fig. 12 is an enlarged side view of the lower paddle shown in Fig. 11;

Fig. 13 is a bottom view of the paddle shown in Fig. 12;

Fig. 14 is an end view of the paddle shown in Fig. 13; and

Fig. 15 is an enlarged partial section taken on line XV—XV of Fig. 11 showing the manner in which the paddles are mounted on the disk.

Figure 1:
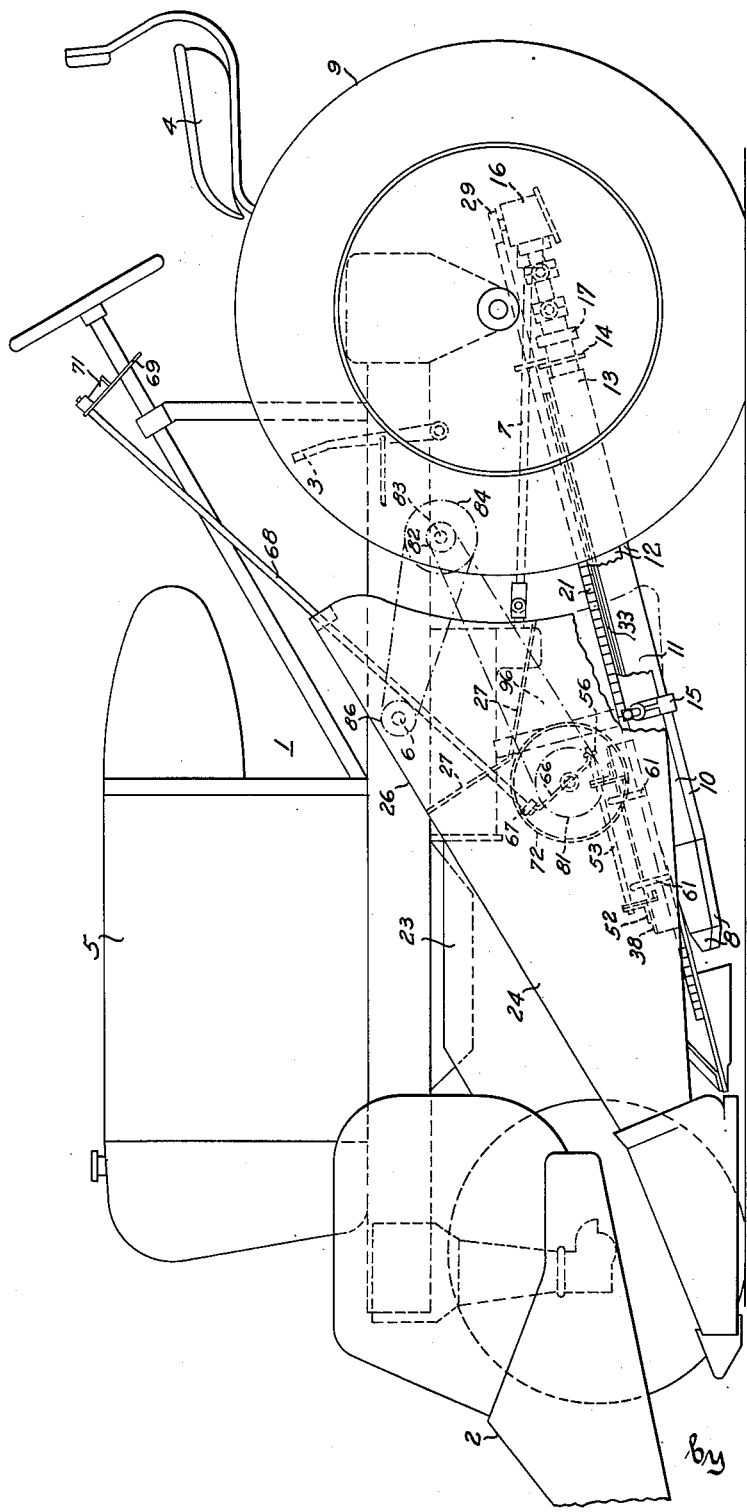
Fig. 1 is a side elevation of a tractor mounted harvester embodying the invention with parts broken away in the interest of clarifying the correlation of elements.
Figures 2, 3, 4:
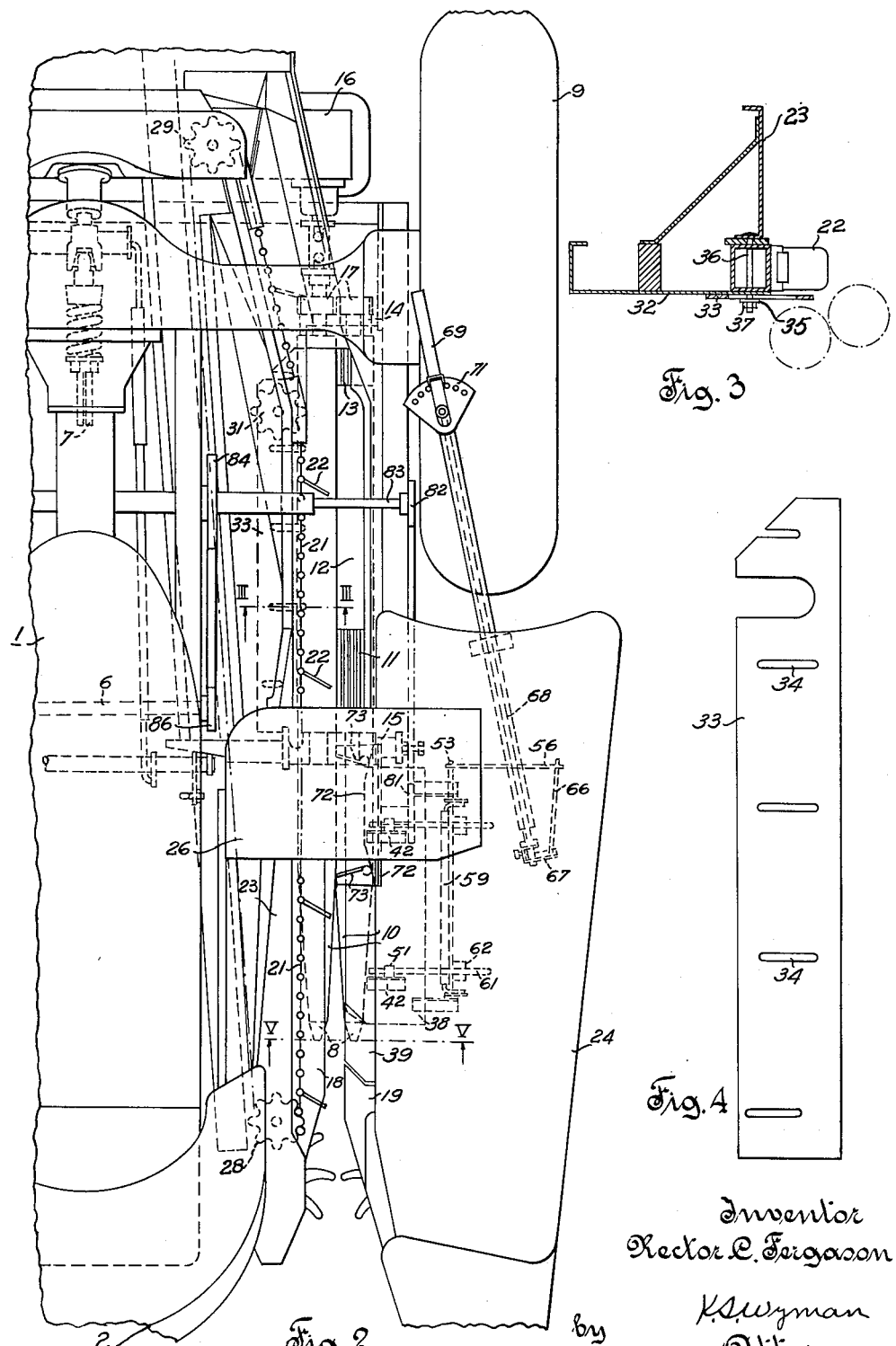
Fig. 2 is a plan view of the left side of the unit shown in Fig. 1 with parts omitted or broken away in the interest of clarity.
Fig. 3 is a partial section taken on line III—III of Fig. 2.
Fig. 4 is a plan view of the husking roll guard or shield appearing in Figs. 1, 2 and 3.

Referring to the drawings and more particularly to Figs. 1 and 2, it is seen that for purposes of illustration the invention may be incorporated in or applied to a tractor mounted harvester including a conventional wheel supported tractor 1 provided with a front wheel shield 2 and with the usual control accessories including a foot pedal or the like 3 disposed adjacent the operator's station or seat 4 for selectively stopping forward movement of the tractor while continuing operation of the engine 5 and of the power take-off shafts 6 and 7 driven thereby, and includes at least one harvester unit comprising a pair of ear picking and husking rolls 8 disposed in side-opposed, forwardly extending relation along one side of the tractor frame and laterally within the tread of the adjacent rear wheel 9.

Each roll 8 may include a forward ear picking or snapping section 10 followed by a first trash section 11, a husking section 12 and a second or last trash section 13. Rear end portions of the rolls are mounted in bearings carried by a bracket 14, and forward end portions of the rolls are mounted in bearings disposed between the ear snapping and first trash sections and carried by a bearing bracket 15. The rear end of the inner roll is flexibly connected with gearing enclosed in a transverse housing 16 and driven from engine power take-off shaft 7, and the outer roll is driven from the inner roll through a geared connection 17 therewith.

In addition, the harvester unit may also include a pair of edge opposed inner and outer stripper plate structures 18 and 19, respectively, overlying the snapping roll sections 10, a gathering and conveying chain 21 having an active course extending longitudinally alongside the inner roll and having flights 22 thereon overlying the inner stripper plate and the trash and husking sections of the inner roll, an inner gathering shield or wall 23 suitably supported to extend longitudinally along and upwardly from the inner side of the active course of the gathering chain, an outer gathering shield or wall 24 suitably supported to extend longitudinally along and upwardly from adjacent the outer side of the outer roll in opposed passage or trough forming relation with respect to the inner shield, and a transverse top wall 26 bridging upper opposed portions of the inner and outer walls 23 and 24 and having an intermediate portion 27 extending downward toward and rearwardly beyond the front bearing bracket 15 in throat forming relation thereto.

The gathering and conveying chain 21 is operatively mounted on a suitably supported front sprocket 28, on a rear driving sprocket 29 mounted on a vertical shaft projecting from and driven by the gearing within transverse housing 16, and on a suitably mounted guiding sprocket 31. In general, the various elements and parts hereinbefore described are constructed and mounted for coaction and operation in substantially the same manner as shown and described in U. S. Patent 2,340,084, C. J. Scranton, granted January 25, 1944, to which reference may be had if additional information is desired.

Referring also to Figs. 3 and 4, it is seen that, in the illustrated embodiment of the invention, the active course of the gathering and conveying chain 21 travels over a plain bottom wall structure or support 32 having an elongated plate 33, approximately equal in length to the combined length of the trash removing and ear husking sections of a roll, adjustably secured to that portion of the underside of the wall which is adjacent to and extends along and above the inner side of the trash removing and ear husking sections of the inner roll. Plate 33 is provided with a series of longitudinally spaced parallel transverse slots 34 and is secured to wall structure 32 by means of bolts 36 therein which extend downward through the slots 34 in plate 33 and have nuts 37 thereon engaging the underside of the plate or washers 35 interposed therebetween. As a result, plate 33 also extends alongside of and above the trash removing and ear husking sections of the inner roll in approximately aligned, end-opposed relation with respect to inner stripper plate 18 and from a point immediately adjacent the rear side of front bearing bracket 15 to a point substantially at the rear end of the second or last trash section 13, and its position may be adjusted either toward or away from a vertical plane midway between the longitudinal axes of the inner and outer rolls. In this connection, the width of plate 33 and the length of the slots 34 therein are sufficient for adjustably positioning the plate in overlying relation with respect to the trash removing and ear husking sections of the inner roll to a sufficient extent (see Figs. 2 and 3) to provide an effective ear supporting extension of inner stripper plate 18 and of the interposed portion of front bearing bracket 15, over and along which picked ears are conveyed by the flights 22 on chain 21 without contacting the trash removing and husking sections of the inner roll. When plate 33 is positioned as best shown in Fig. 3, a considerable quantity of the trash carried over and along the portions of the rolls rearward of front bearing bracket 15 will be engaged by the coacting surfaces thereof and pulled downward through the space between plate 33 and the outer roll and will pass between the rolls and out of the machine. And consequently, it should now be obvious that the provision of adjustably mounted plate 33 constitutes means for selectively rendering the husking rolls or roll sections either effective to remove the husks from picked ears traveling thereover or effective as a nonhusking, trash removing conveyor part over and along which picked ears travel in passing from the snapping rolls to a wagon loading conveyor or other means receiving and removing picked ears from the harvesting unit.

Referring now to Figs. 6–9, inclusive, in connection with Figs. 1 and 2, it will also be seen that in the illustrated embodiment of the invention, the outer stripper plate structure 19 includes an elongated rear plate part 38 closing the gap between a front plate part 39 and the opposed side of front bearing bracket 15. Plate 38 is mounted between the underside of an outwardly extending flange 41 on outer wall 24 and opposed plate supporting parallel top wall portions 42 presented by a pair of longitudinally spaced brackets 43 carried by an underlying frame part 44. And a pair of bolts or the like 46 pass through aligned holes in flange 41 and plate supporting walls 42 and through a pair of parallel transverse slots 47 in plate 38 thus permitting a limited movement of the plate relative to flange 41 and walls 42 and either toward or away from the opposed stripper plate 18.

Plate 38 is provided with an outer depending edge flange 48 having a pair of longitudinally spaced holes 49 therethrough aligned with internally threaded holes provided in laterally projecting parts 51 on brackets 43. Plate 38 is also provided with a pair of outwardly projecting detachably mounted angle brackets 52 having outer vertical wall portions provided with aligned holes rotatably supporting a round rod 53 extending therethrough. Rod 53 is provided with depending strap parts 54 secured thereto for movement therewith in side-abutting engagement with the opposed vertical wall portions of brackets 52 thereby preventing an axial movement of the rod relative to plate 38. And one end of rod 53 has secured thereto an actuating arm 56 for effecting a turning movement of the rod in and relative to brackets 52. The lower opposed surface portions of strap parts 54 are provided with axially aligned pins 57 fixed thereto and journaled in aligned holes provided in opposed brackets 58 detachably secured to opposite end portions of a channel bar 59. A pair of plate adjusting handle parts 61 extend in rotatably supported relation through a pair of brackets 62 detachably secured to frame part 44, through a pair of openings 63 in bar 59, through the openings 49 in the edge flange portion 48 of plate 38 and through and in threaded engagement with the laterally projecting parts 51 on brackets 43. Each handle part is provided with a pair of axially spaced opposed collar portions 64 engaging opposite sides of bar 59, and the openings 63 in bar 59 are preferably formed with adjacent end portions sufficiently enlarged for the insertion of collar portions 64 therethrough in order to facilitate assembly.

The outer end of arm 56 (see Figs. 1 and 2) is pivotally connected with one end of a link 66 having its opposite end pivotally connected with an arm 67 on the adjacent end of an actuating rod or the like 68 suitably supported for rotation with its upper or remote end disposed within easy reach of an operator sitting on the driver's seat or station 4. The upper end of rod 68 is provided with a laterally projecting handle portion 69 operatively associated with an apertured quadrant or other suitable means 71 for releasably retaining the rod 68 in a selected position.

With the parts for mounting and adjusting plate 38 constructed and combined as hereinbefore described, it should be obvious that bar 59 is carried by handle parts 61 for axial movement therewith as such parts are turned, that the position of plate 38 can be adjusted relative to opposed stripper plate 18 by turning handle parts 61 as the pivotal connection of link 66 with arms 56 and 67 permits the crank lever comprising rod 53 and arms 54 and 56 to move bodily with bar 59 and relative to arm 67 fixed on actuating rod 68, and that when plate 38 is positioned as desired by turning handle parts 61, it can be suddenly and quickly further adjusted to the extent permitted by the slots 47 therein simply by turning actuating rod 68 whereupon the lever comprising rod 53 and arms 54 and 56 then pivots about the common axis of its pins 57 journaled in bar carried brackets 58.

Referring again to Figs. 1 and 2 and also to Figs. 10–15, inclusive, it is seen that the illustrated embodiment of the invention also includes a generally concave, convex disk element 72 which is mounted for rotation immediately above the rear end of adjustable plate 38 and in partially underlying relation with respect to throat forming wall 27 with its concave surface disposed in proximate opposed relation with respect to the inner surface of outer wall 24. And the inner or convex surface of the disk has diametrically opposed portions thereof provided with a pair of similar paddles or fingers 73 projecting therefrom in the general direction of the inner gathering shield or wall 23 and to a point immediately adjacent a vertical longitudinal plane substantially flush with the inner edges of the flights 22 on chain 21. Disk 72 includes a detachable hub part 74 which extends through an opening in outer wall 24 and is journaled on a stationary shaft 76 having its outer end portion supported by a collar or like structure 77 which is in turn rigidly supported and braced by a frame mounted bracket 78 and a member 79. Hub part 74 is provided with a sprocket wheel 81 aligned with and driven in the direction indicated by the arrow on Fig. 10 from a sprocket wheel 82 on a transverse tractor mounted shaft 83 which also includes a second sprocket wheel or pulley 84 which is aligned with and driven from a pulley or sprocket wheel 86 on the adjacent end of tractor power shaft 6. And it should now be obvious that the operator can readily manipulate the conventional tractor and engine controls (as hereinbefore mentioned) to stop forward movement of the tractor while continuing operation of the harvester rolls 8 and rotary feeder 72.

Each paddle 73 (see Figs. 12, 13 and 14) is formed to present a plain triangular wall 87 having its base edge provided with a pair of spaced aligned pin receiving hinge projections 88 and a depending stop part 89 adapted to abut the inner surface of the disk, and having a side edge provided with a coextensive depending wall 91 merging at its base end with stop projection 89. And each paddle is detachably secured to the disk and normally retained in the relative position shown in Figs. 2, 10 and 11 by means of a pin 92 passing through hinge projections 88, through an interposed coiled biasing spring 93 having its opposite ends offset to engage the disk 72 and paddle wall 87, and through a pair of supporting brackets 94 bolted to disk 72 with their pin receiving portions closely opposing the outer remote ends of hinge projections 88. In order to facilitate assembly, one end of pin 92 is preferably welded or otherwise permanently secured to its supporting bracket 94. In this connection, pins 92 are secured to diametrically opposed portions of the disk in substantially parallel relation with respect to each other, and the paddles are preferably positioned on the pins to present edge wall 91 in leading relation with respect to the direction of rotative travel as indicated in Fig. 10. And the springs 93 act to retain the paddles positioned as best shown in Figs. 2, 10 and 11 and yet permit same to in effect fold inward toward the center of the disk in the event two much material gets between a paddle and the opposed surface of stripper plate 38 or between a paddle and the opposed surface of wall 27.

In operation, each paddle when moving in proximity to stripper plate 38 coacts with the flights 22 on chain 21 in feeding ears and other loose material rearwardly through the lower portion of the throat 96 formed by overlying wall portion 27 and to engage and feed trash tending to accumulate in such throat above the flights on chain 21 upward and forward through the upper portion of the throat. Moreover, the coaction between the paddles and the stripper plates and/or rolls is such that the inner portion of wall 91 will engage ears as they are snapped from standing stalks passing between the plates and/or rolls and push the ear over onto the rolls with its tasseled end pointing longitudinally of the rolls in their direction of travel therealong. Furthermore, it should be noted that in the event the paddles should fold toward the center of the disk with their wall portions 87 abutting same, the wall portions 91 will still coact with the chain 21 in feeding ears and trash into the machine through throat 96 and will also act to remove plugging accumulations from such throat, in substantially the same manner as previously described but with a somewhat lesser degree of effectiveness. In addition, it should also be noted that the generally concave, convex configuration of disk 72 permits mounting same adjacent a trough or passage forming side wall in a manner substantially preventing trash and the like from entering and accumulating in the space between the disk and the wall structure opposing same.

In picking corn with a harvester unit embodying the present invention, the husking rolls or roll sections can be readily rendered selectively effective either to remove the husks from picked ears traveling thereover or to act as a nonhusking, trash removing conveyor part over and along which picked ears travel in passing to a wagon loading conveyor or other means receiving the picked ears. And in addition, the picking operation can be substantially continuous and extremely effective even under adverse conditions resulting from variations in crop and weed growth throughout a field simply by manipulating hand lever 69 to quickly effect a conforming change in strippr plate spacing without stopping harvester travel and operation of the picking rolls or roll sections, as the operation of feeder 72 will in most cases prevent an accumulation of trash in throat 96. However, if for any reason throat 96 should become filled with an accumulation of trash plugging same, such an accumulation of trash can be readily mechanically removed simply by stopping forward travel of the harvester while continuing operation of the rolls 8, chain 21 and feeder 72 as the coaction of these parts will in most cases quickly clear the throat of trash without manual aid from the operator. In this connection, the mechanical removal of such trash will in some cases be materially aided by actuating handle 69 to effect a maximum spacing of the stripper plates in the event the plates are not so positioned when the plugging occurs.

And while certain features of the invention are more particularly applicable to harvesters of the type embodying cooperative rolls presenting axially aligned ear snapping and husking sections, other features are of general application. And it should be understood that it is not intended to limit the invention to the exact details of construction, combinations of elements and arrangements of parts herein shown and described for purposes of illustration as various modifications within the scope of the appended claims may occur to persons skilled in the art.

It is claimed and desired to secure by Letters Patent:

1. In a traveling corn harvester embodying a pair of power operated rolls having longitudinally aligned ear snapping and husking sections mounted in side-opposed vertically stepped coacting relation, a pair of edge-opposed stripper plates mounted in operative gap-forming relation above the ear snapping sections of said rolls, a third plate mounted to extend coextensively alongside of and above the husking section of the lower one of said rolls and in approximately aligned, end-opposed relation with respect to the stripper plate overlying the lower roll, a gathering and conveying chain having an active course traveling longitudinally of the rolls in superposed relation with respect to said third plate and to the stripper plate end-opposing same, said chain having flights thereon effective to draw standing stalks between the rolls and stripper plates and to engage and convey picked ears longitudinally of the rolls and along the husking sections thereof, and means adjustably supporting said third plate for movement generally toward or away from the higher one of said rolls and into or out of a position wherein said third plate is disposed in overlying relation with respect to the husking section of the lower roll to a sufficient extent to provide an effective ear supporting extension of said end-opposed stripper plate over and along which picked ears are conveyed by the flights on said chain without contacting the husking section of the lower roll.

2. In a traveling corn harvester embodying a pair of power operated rolls having longitudinally aligned ear snapping and husking sections mounted in side-opposed coacting relation, a pair of edge-opposed stripper plates mounted in operative gap-forming relation above the ear snapping sections of said rolls, a third plate mounted to extend coextensively alongside of and above the husking section of one of said rolls and in approximately aligned, end-opposed relation with respect to one of said stripper plates, a gathering and conveying chain having an active course traveling longitudinally of said rolls in superposed relation with respect to said one stripper plate and said third plate, said chain having flights thereon effective to draw standing stalks between the rolls and stripper plates and to engage and convey picked ears longitudinally of the rolls and along the husking sections thereof, and means adjustably supporting said third plate and the other one of said stripper plates for independent movement generally toward or away from a vertical plane midway between the longitudinal axes of said rolls.

3. In a traveling corn harvester embodying a pair of power operated rolls having longitudinally aligned ear snapping and husking sections mounted in side-opposed coacting relation, a pair of edge-opposed stripper plates mounted in operative gap-forming relation above the ear snapping sections of said rolls, a third plate mounted to extend coextensively alongside of and above the husking section of one of said rolls and in approximately aligned, end-opposed relation with respect to one of said stripper plates, a gathering and conveying chain having an active course traveling longitudinally of said rolls in superposed relation with respect to said one stripper plate and said third plate, said chain having flights thereon effective to draw standing stalks between the rolls and stripper plates and to engage and convey picked ears longitudinally of the rolls and along the husking sections thereof, and means adjustably supporting said third plate and the other one of said stripper plates for independent movement generally toward or away from a vertical plane midway between the longitudinal axes of said rolls, said means including parts for retaining said third plate positioned to provide an effective ear supporting extension of said one stripper plate over and along which picked ears are conveyed by the flights on said chain without contacting the husking section of said one roll.

4. In a traveling corn harvester embodying a pair of power operated rolls having longitudinally aligned ear snapping and husking sections mounted in side-opposed coacting relation, a pair of edge-opposed stripper plates mounted in operative gap-forming relation above the ear snapping sections of said rolls, a third plate mounted to extend coextensively alongside of and above the husking section of one of said rolls and in approximately aligned, end-opposed relation with respect to one of said stripper plates, a gathering and conveying chain having an active course traveling longitudinally of said rolls in superposed relation with respect to said one stripper plate and said third plate, said chain having flights thereon effective to draw standing stalks between the rolls and stripper plates and to engage and convey picked ears longitudinally of the rolls and along the husking sections thereof, and means adjustably supporting said third plate for movement generally toward or away from the other one of said rolls and into or out of a position wherein said third plate is disposed in overlying relation with respect to the husking section of said one roll to a sufficient extent to provide an effective ear supporting extension of said one stripper plate over and along which picked ears are conveyed by the flights on said chain without contacting the husking section of said one roll.

5. In a traveling corn harvester embodying a pair of power operated rolls having longitudinally aligned ear snapping and husking sections mounted in side-opposed coacting relation, a pair of bearing structures rotatably supporting portions of said rolls intermediate said ear snapping and husking sections, a plate mounted to extend coextensively alongside of and above the husking section of one of said rolls, a gathering and conveying chain having an active course traveling longitudinally of said rolls in superposed relation with respect to said bearing structures and plate, said chain having flights thereon effective to draw standing stalks between the snapping sections of the rolls and to engage and convey picked ears over said bearing structures and longitudinally along the husking sections of said rolls, and means supporting said plate for movement generally toward or away from the other one of said rolls and into or out of a position wherein said plate is disposed in overlying ear receiving and supporting relation with respect to the husking section of said one roll whereby the flights on said chain convey picked ears over and along said plate and out of contact with the husking section of the roll beneath same.

6. In a traveling corn harvester embodying a pair of power operated rolls having longitudinally aligned ear snapping and husking sections mounted in side-opposed vertically stepped coacting relation, a plate mounted to extend coextensively alongside of and above the husking section of the lower one of said rolls, a gathering and conveying means having an active course traveling longitudinally of said rolls in superposed relation with respect to said plate, said means including parts effective to draw standing stalks between the snapping sections of the rolls and to engage and convey picked ears longitudinally along the husking sections of said rolls, and means adjustably supporting said plate for movement generally toward or away from the higher one of said rolls and into or out of a position wherein said plate is disposed in overlying ear receiving and supporting relation with respect to the husking section of said one roll whereby parts of said gathering and conveying means convey picked ears over and along said plate and out of contact with the husking section of the roll beneath same.

7. In a traveling corn harvester embodying a pair of power operated ear snapping rolls mounted in side-opposed vertically stepped coacting relation adjacent lower edge portions of passage forming side wall structures extending longitudinally of the rolls, a pair of edge-opposed stripper plates mounted in operative gap-forming relation above said rolls, a power driven gathering and conveying means extending longitudinally alongside the lower one of said rolls and in superposed relation with respect to the stripper plate overlying same, said gathering and conveying means including parts coacting with said stripper plate, and said one roll to draw standing stalks between said rolls and stripper plates, an operator's station disposed in remote elevated rearward relation with respect to said stripper plates, means supporting the stripper plate overlying the higher one of said rolls for ready movement either toward or away from the other stripper plate, and adjusting mechanism operatively connected with said one stripper plate and including a part actuably disposed adjacent said operator's station for suddenly and rapidly adjusting the position of said one stripper plate.

8. In a traveling corn harvester embodying a pair of power operated ear snapping rolls mounted in side-opposed coacting relation, a pair of edge-opposed stripper plates mounted in operative gap-forming relation above said rolls, a gathering and conveying means extending longitudinally alongside one of said rolls and in superposed relation with respect to the stripper plate overlying same, said gathering and conveying means including parts coacting with said stripper plate and said rolls to draw standing stalks therebetween, an operator's station disposed in remote elevated rearward relation with respect to said stripper plates, means supporting one of said stripper plates for ready movement either toward or away from the other stripper plate, and adjusting mechanism operatively connected with said one stripper plate and including a part actuably disposed adjacent said operator's station for suddenly and rapidly shifting the position of said one stripper plate.

9. In a traveling corn harvester incorporating an ear picking means including a picked ear supporting portion, a pair of husking rolls disposed in adjacent picked ear receiving relation with respect to the rear end of said picking means, a plate mounted to extend coextensively alongside of and above the active portion of one of said rolls in rearward continuing relation with respect to the adjacent end of said picked ear supporting portion, a conveying means operatively associated with said picking means and rolls to extend therealong in superposed relation with respect to said supporting portion and with respect to said plate, means adjustably supporting said plate for movement generally toward or away from the other of said rolls and into and out of position wherein said plate is disposed in overlying ear receiving and supporting relation with respect to said one roll whereby said conveying means moves picked ears over and along said plate and out of contact with said one roll.

10. In a traveling corn harvester incorporating an ear picking means including a picked ear supporting portion, a pair of husking rolls disposed in picked ear receiving and supporting relation with respect to the discharge end of said ear supporting portion, a plate mounted to extend coextensively alongside of and above the active portion of one of said rolls in continuing relation with respect to the discharge end of said picked ear supporting portion, conveying means associated with said picking means, plate and rolls to extend therealong in superposed relation with respect to said supporting portion and with respect to said plate and rolls, and means adjustably supporting said plate for movement generally toward or away from the other of said rolls and into and out of a position wherein said plate is disposed in ear receiving and supporting relation with respect to the discharge end of said supporting portion whereby said conveying means moves picked ears over and along said plate and out of contact with at least one of said rolls.

11. In a traveling corn harvester embodying a pair of rolls mounted in operative side opposed ear supporting relation, a pair of edge-opposed stripper plates mounted in operative gap forming relation above said rolls, a gathering and conveying means extending longitudinally of said rolls in superposed relation with respect to at least one of said stripper plates, said gathering and conveying means including parts coacting with said stripper plate and said rolls to draw standing stalks therebetween, an operator's station disposed in remote elevated relation with respect to said stripper plates, means for supporting one of said stripper plates for ready movement either toward or away from the other stripper plate, and adjusting mechanism operatively connected with said one stripper plate and including a part actuably disposed adjacent said operator's station for suddenly and rapidly shifting the position of said one stripper plate.

RECTOR C. FERGASON.

REFERENCES CITED

The following references are of record in the file of this patent:

UNITED STATES PATENTS

| Number | Name | Date |
| --- | --- | --- |
| 138,181 | Patton | Apr. 22, 1873 |
| 461,246 | Meader | Oct. 13, 1891 |
| 717,153 | Asper | Dec. 30, 1902 |
| 1,821,985 | Peterson | Sept. 8, 1931 |
| 1,952,507 | Lindgren et al. | Mar. 27, 1934 |
| 2,340,084 | Scranton | Jan. 25, 1944 |